United States Patent
Putnam et al.

(10) Patent No.: US 6,537,678 B1
(45) Date of Patent: Mar. 25, 2003

(54) NON-CARCINOGENIC CORROSION INHIBITING ADDITIVE

(75) Inventors: John William Putnam, Glastonbury, CT (US); Mark Jaworowski, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 230 days.

(21) Appl. No.: 09/666,402

(22) Filed: Sep. 20, 2000

(51) Int. Cl.$^7$ .......................... B32B 15/04; C23C 22/00
(52) U.S. Cl. .................. 428/469; 428/472; 428/704; 106/14.05; 106/14.11; 106/14.12; 106/14.21; 106/14.44
(58) Field of Search ................. 428/469, 472, 428/704; 106/14.05, 14.11, 14.12, 14.21, 14.44

(56) References Cited

U.S. PATENT DOCUMENTS

| | | | |
|---|---|---|---|
| 2,387,528 A | | 10/1945 | Patterson et al. |
| 2,430,589 A | | 11/1947 | Sloan |
| 2,902,394 A | | 9/1959 | Jeremias |
| 3,063,877 A | | 11/1962 | Schiffman |
| 3,066,055 A | | 11/1962 | Pimbley |
| 3,279,958 A | | 10/1966 | Maurer et al. |
| 3,849,264 A | | 11/1974 | Weber et al. |
| 4,119,763 A | * | 10/1978 | Blair .................. 428/328 |
| 4,711,667 A | | 12/1987 | Bibber |
| 5,192,374 A | | 3/1993 | Kindler |
| 5,192,447 A | * | 3/1993 | Fivizzani ............. 210/697 |
| 5,194,138 A | | 3/1993 | Mansfeld et al. |
| 5,244,956 A | * | 9/1993 | Miller ................. 524/403 |
| 5,266,611 A | | 11/1993 | Teschendorf |
| 5,322,560 A | * | 6/1994 | DePue et al. ......... 106/14.21 |
| 5,520,750 A | | 5/1996 | Riley |
| 5,527,388 A | * | 6/1996 | Berke et al. |
| 5,582,654 A | | 12/1996 | Mansfeld et al. |
| 5,866,652 A | | 2/1999 | Hager et al. |
| 6,077,885 A | | 6/2000 | Hager et al. |
| 6,248,184 B1 | | 6/2001 | Dull et al. |
| 6,287,394 B1 | | 9/2001 | Buxton et al. |
| 6,312,812 B1 | | 11/2001 | Hauser et al. |
| 6,315,823 B1 | * | 11/2001 | Dolan .................. 106/14.21 |

FOREIGN PATENT DOCUMENTS

| | | |
|---|---|---|
| CA | 2057825 | 6/1992 |
| EP | 0 492 713 | 7/1992 |
| EP | 0 640 668 | 3/1995 |
| JP | 04218681 | 8/1992 |
| WO | 96/15292 | 5/1996 |
| WO | WO 00 36176 | 6/2000 |
| WO | WO 01/86016 | 11/2001 |

OTHER PUBLICATIONS

The Investigation of cerium as a cathodic inhibitor. A.J. Aldykewicz, Jr., H.S. Isaacs, and A.J. Davenport, Oct. 1995, Journal of the Electrochemical Society vol. 142, p. 3342–3350.*
"Development of Stainless Aluminum" By Mansfeld, published Dec. 12, 1991, pp. L74–L75.
"The Cerium–molybdenum Process for the Development . . . ," By Mansfeld et al., published (1992), pp. 2277–2282. No month.
"Approaches Towards the Development of a . . . " By Mansfeld et al., published (1992), pp. 191–200. No month.
"Corrosion Protection of High Copper Aluminum . . . ", By Mansfeld et al., published (1994), pp. 194–200. No month.
"Chemically Induced Passivity of Aluminum . . . ," By Mansfeld et al., published (1995) pp. 1–66. No month.
"Development of 'Stainless' Aluminum . . . ," By Mansfeld et al., published Jul. 15, 1995, pp. 51–61.
"The Investigation of Cerium as a Cathodic . . . ," By Aldykewicz et al., published (1995), pp. 3342–3350. No month.
"Surface Treatment Technologies for Aluminum and Magnesium," By Morita et al., published (2000), pp. 560–565. No month.
"Development of the Non–Chromate Surface Technology . . . ", By Kobayashi et al., published (2000), pp. 6–8. No month.

* cited by examiner

Primary Examiner—Deborah Jones
Assistant Examiner—Jennifer McNeil
(74) Attorney, Agent, or Firm—Bachman & LaPointe, P.C.

(57) ABSTRACT

A non-carcinogenic corrosion inhibiting additive includes an anodic corrosion inhibitor and a cathodic corrosion inhibitor.

21 Claims, No Drawings

NON-CARCINOGENIC CORROSION INHIBITING ADDITIVE

BACKGROUND OF THE INVENTION

The present invention relates to a corrosion inhibiting additive and, more particularly, a corrosion inhibiting additive which is as effective as hexavalent chromium compounds but which do not have the health hazards associated with hexavalent chromium compounds.

Corrosion inhibitive compounds have long been used on, for example, metallic surfaces to inhibit corrosion thereof. U.S. Pat. No. 2,387,528 describes alkaline earth metal chromates containing trivalent as well as hexavalent chromium as additives for metal protective pigments. U.S. Pat. No. 2,430,589 describes protective pigments comprising calcium chromate associated with minor additions of ferric, manganic or chromic oxides. U.S. Pat. No. 2,902,394 describes the use of soluble chromium containing compounds used in aqueous metal treating or rinsing solutions applied to metal surfaces or to the conversion coating onto metal surfaces to improve corrosion resistance. U.S. Pat. No. 3,063,877 describes aqueous solutions for treating metal surfaces to in part improve corrosion resistance which are prepared by partially reducing a dissolved hexavalent chromium compound with formaldehyde. U.S. Pat. No. 3,279,958 describes rinsing of phosphate, chromate and other chemical conversion coatings on metal surfaces with a dilute aqueous acid solution of a chromium-chromate complex followed by a water rinse. The complex is prepared by treating aqueous chromic acid solution with an organic reducing agent to reduce a portion of the hexavalent chromium to the trivalent state.

In the aerospace industry, aluminum alloys achieve their high strength to weight ratio by inclusion of such additional elements as copper, silicon, chromium, manganese, zinc and magnesium. The presence of these elements in high strength aluminum alloys make them more susceptible to corrosion attack than pure aluminum. These high strength aluminum alloys are, therefore, generally protected in service by use of corrosion inhibitive compounds based on hexavalent chromium. These compounds includes barium or strontium chromate particles used as inhibitive pigments and adhesives, paints and primers, chromic acid, which is used to produce a chromium-rich conversion coating, and sodium and potassium dichromate, which are used as sealing compounds for anodized films.

All forms of hexavalent chromium are recognized by the United States National Institute of Environmental Health Sciences as a Group 1 known human carcinogen. Accordingly, the use of corrosion inhibiting compounds which contain forms of hexavalent chromium are subject to stringent regulation and control. It would be very beneficial to eliminate hexavalent chromium as a corrosion inhibiting additive to corrosion inhibitive compounds as described above.

U.S. Pat. No. 5,030,285 describes a substitute corrosion inhibiting pigment for hexavalent chromium compounds. The corrosion inhibiting additive includes a combination ferric phosphate and ferrous phosphate. While the proposed corrosive inhibiting additive does not suffer from the possible health problems associated hexavalent chromium compounds, it has not proved to be particularly effective in inhibiting corrosion, particularly of metals, when used as an additive in inhibitive pigments in adhesives, paints and primers, as a conversion coating.

Naturally, it would be highly desirable to provide corrosion inhibitors which can be used and substituted for hexavalent chromium inhibitors so as to avoid potential health hazards while at the same time provide effective corrosion protection on metal surfaces, particularly, high strength aluminum alloys used in aerospace applications.

Accordingly, it is the principle object of the present invention to provide a corrosion inhibiting additive which is non-carcinogenic.

It is a particular object of the present invention to provide a corrosion inhibiting additive as set forth above which is effective in preventing corrosion attack on metals.

It is a further object of the present invention to provide a corrosion inhibiting additive as set forth above which is particularly effective when applied to high strength aluminum alloys.

It is a still further object of the present invention to provide a corrosion inhibiting additive as set forth above which is effective against both general corrosion and pitting corrosion.

Further objects and advantages of the present invention will appear hereinbelow.

SUMMARY OF THE INVENTION

In accordance with the present invention, the foregoing objections and advantages are readily obtained.

The present invention is drawn to a non-carcinogenic corrosion inhibiting additive comprising an anodic corrosion inhibitor and cathodic corrosion inhibitor. The inhibiting additive comprises a combination of an anodic corrosion inhibitor and a cathodic corrosion inhibitor. The inhibiting additive of the present invention provides protection against both localized pitting corrosion and general corrosion. Suitable additives which are non-carcinogenic and comprise both anodic corrosion inhibitors and cathodic corrosion inhibitors. Particularly suitable additives include cerous molybdate with bismuth vanadate, cerous molybdate with strontium tungstate, cerous phosphate with strontium tungstate, bismuth vanadate with bismuth molybdate and strontium tungstate, and mixtures thereof. Preferred inhibiting additives are compounds of tungsten and cerium. Particularly preferred inhibiting additives are those additives which comprise cerous and tungstate compounds.

The corrosion inhibiting additive of the present invention may be used as an inhibitive additive in adhesives, paints and primers, sealants, epoxies and the like which are thereafter applied to a substrate by mechanical methods known in the art or dissolved in solution and applied to a substrate as a conversion coating.

DETAILED DESCRIPTION

The present invention is drawn to a non-carcinogenic corrosion inhibiting additive and, more particularly, a non-carcinogenic corrosion inhibiting additive which is effective against general corrosion and pitting corrosion.

In accordance with the present invention, the non-carcinogenic corrosion inhibiting additive comprises, in combination, an anodic corrosion inhibitor and a cathodic corrosion inhibitor. By anodic corrosion inhibitor is meant suppression of metal oxidation reactions. By cathodic corrosion inhibitor is meant suppression of reduction reactions. In order to be effective, both the anodic and cathodic corrosion inhibitors should be "strong" corrosion inhibitors. By strong anodic corrosion inhibitor is meant a compound that is soluble in alkaline media, while precipitating as a reduced, insoluble oxide under neutral and acidic reducing conditions, that is, existing as an insoluble oxide below −600 mv vs Ag/AgCl at pH 7, and below −300 mv vs Ag/AgCl at pH 2. By a strong cathodic corrosion inhibitor is meant a compound that is soluble in acidic media, while undergoing a valance change to precipitate as an insoluble oxide under neutral and alkaline and moderately oxidizing conditions, that is, existing as an insoluble oxide above −300 mv vs Ag/AgCl at pH 7, and above −900 mv vs Ag/AgCl at pH 12. The corrosion inhibiting additive requires both an anodic corrosion inhibitor and a cathodic corrosion inhibitor in order to be effective against general corrosion and pitting corrosion. General corrosion means uniform dissolution of base metal. By pitting corrosion is meant localized corrosion of base metal resulting in the formation of corrosion pits. The anodic corrosion inhibitor is effective against general corrosion while the cathodic corrosion inhibitor is particularly effective against pitting corrosion.

Suitable cathodic corrosion inhibitors for use in the inhibiting additive of the present invention are the elements of Group IIIB of the Periodic Table (the CAS version). All of the foregoing elements have cathodic corrosion inhibiting characteristics; however, it has been found that cerium, neodymium and praseodymium are "strong" cathodic corrosion inhibitors as defined above and are therefore preferred Group IIIB elements. Particularly preferred cathodic corrosion inhibitors are compounds of cerium and, most preferred are cerous compounds. Suitable anodic corrosion inhibitors for use in the inhibiting additive of the present invention include elements from Groups VB and VIB of the Periodic Table, with the exception of hexavalent chromium, and more particularly include compounds of vanadium, molybdenum and tungsten and more particularly tungstate compounds. Suitable additives which are non-carcinogenic include, for example, cerous molybdate with bismuth vanadate, cerous molybdate with strontium tungstate, cerous phosphate with strontium tungstate, bismuth vanadate with bismuth molybdate and strontium tungstate, and mixtures thereof.

The corrosion inhibiting additive of the present invention may be added as an inhibitive pigment in adhesives, paints and primers, sealants, epoxies and the like (hereafter referred to as an organic carrier). These products may be applied to the substrate which is being protected by any suitable manner known in the art such as spraying, brushing, or the like. In addition, the corrosion inhibiting additive, which must be at least partially soluble in water, may be dissolved in a carrier such as alcohol, water or the like and formed on the surface of a substrate as a conversion coating. In either case, that is, as an additive to adhesive, paints and primers, epoxies and the like, or as an additive to a solution for conversion coating, the corrosion inhibiting additive is provided in a solution comprising a carrier and the corrosion inhibiting additive. In the first case described above with regard to paints and primers, etc., the carrier may be at least an organic binder. When the corrosion inhibiting additive is to be applied by conversion coating, the carrier may simply be, for example, water or alcohol. Solutions for conversion coatings and compounds used as adhesives, paints and primers, and epoxies and their preparation are well-known in the art as evidenced by the above-referenced patents referred to in the background of the invention.

When the corrosion inhibiting additive is used as an additive to solutions such as adhesives, paints and primers, sealants, epoxies and the like (herein referred to as organic carriers), it is preferred that the additive be present in an amount of between about 1 to 50 wt. % and the minimum amount of anodic corrosion inhibitor and cathodic corrosion inhibitor is at least 0.25 wt. % and 0.25 wt. %, respectively. It is preferred that molar solubility in water of the anodic corrosion inhibitor and the cathodic corrosion inhibitor lie between $10^{-6}$ and $10^{-2}$ mol/liter.

When the corrosion inhibiting additive is dissolved in solution with a carrier, such as alcohol or water, and applied to a substrate as a conversion coating, it is preferred that the additive be present in an amount of between about 50 to 1000 mg/ft$^2$ and wherein the minimum amount of anodic corrosion inhibitor and cathodic corrosion inhibitor is at least 25 mg/ft$^2$ and 25 mg/ft$^2$, respectively. The concentration of the anodic corrosion inhibitor and cathodic corrosion inhibitor in the carrier should be between 1 and 100 grams/liter, preferably between 10 and 50 grams/liter. With the corrosion inhibiting additive is dissolved with the carrier for use in water circulation systems such as boiler feed systems, radiator fluid systems, and the like, the concentration of the anodic corrosion inhibitor and the cathodic corrosion inhibitor in the carrier should be between 1 ppm and 1000 ppm, preferably between 10 ppm and 500 ppm.

The corrosion inhibiting additive is particularly useful in preventing general corrosion and pitting corrosion on metal substrates, particularly, high strength aluminum alloys for use in the aerospace industry. The additive may be applied in any manner known in the art including as a conversion coating, or applied as a primer, paint, organic sealant, sealer for anodized aluminum, additive for recirculating water system or the like. Obviously the use of the corrosion inhibiting additive of the present invention extends to other fields outside of aerospace and includes automotive, architectural, packaging, electronics, HVAC and marine.

The final product is an article comprising a metal substrate having a corrosion inhibiting coating having a corrosion inhibiting additive which comprises an anodic corrosion inhibitor and a cathodic corrosion inhibitor on the final product wherein the anodic corrosion inhibitor is present between 0.25 wt. % to 50 wt. % and the cathodic corrosion inhibitor is present between 0.25 wt. % to 50 wt. %. When the corrosion inhibiting additive is applied as a conversion coating on the metal substrate, it is preferred that the coating have a coating weight of at least 50 mg/ft$^2$, preferably between 100 and 500 mg/ft$^2$, and the anodic corrosion inhibitor and cathodic corrosion inhibitor be present in an amount of between 25 to 250 mg/ft$^2$ and 25 to 250 mg/ft$^2$, respectively. When the corrosion inhibitive additive is incorporated into an organic carrier (as described above) and applied to the metal substrate by mechanical methods known in the art, the coating should have a thickness of at least 2.5 microns, preferably between 2.5 and 250 microns, and the anodic corrosion inhibitor and cathodic corrosion inhibitor be present in an amount of between 0.25 wt. % to 25 wt. % and 0.25 wt. % to 25 wt. %, respectively.

The corrosion inhibiting properties of the additive of the present invention will now be made clear from the following example.

EXAMPLE

In order to demonstrate the effectiveness of the corrosion inhibiting additives of the present invention, an electrochemical cell was employed and twenty-four potential corrosion inhibiting additives were tested. The testing was carried out as follows. Slurries of candidate corrosion inhibitive pigments were prepared by magnetically stirring the pigments in 5 weight % sodium chloride solution for 24 hours and adjusting to pH 7.0 with sodium hydroxide or hydrochloric acid as required. Samples of alumina grit blasted 6061 T6 aluminum alloy were fixtured in a paint cell, obtained from Gamry Instruments, that exposed 18 cm² of surface. The paint cell was equipped with a silver / silver chloride reference electrode and a graphite rod counter electrode. The supernatant 5% sodium chloride solutions in contact with the candidate inhibitive pigments were added to the paint cell. The specimens were stabilized at $E_{corr}$ for 30 minutes. An impedance scan of 10 mV amplitude was run from 10KhZ to 0.01 Hz . A linear polarization scan was be run from −200 mV to +600 mV of the corrosion potential.

The measured values of the output of this testing were:

$E_{pit}$-$E_{corr}$, mV $I_{corr}$, $\mu$A/cm²

Z, Kohm

Where $E_{pit}$-$E_{corr}$ is indicative of pitting corrosion wherein the higher the value the greater the additive effect on pitting corrosion, $I_{corr}$ is indicative of general corrosion wherein the lower the value the greater the additive effect, and Z indicates the barrier surface film quality wherein the higher the value the greater the additive effect. The results are set forth below in Tables I and II.

TABLE 1

Electrochemical Measurements of Individual Inhibitors

| Test Code | Compound | Concentration of elements in supernatant, $\mu$mol/L | | | | | | $I_{corr}$, uA/cm² | $E_{pit}$–$E_{corr}$, mV | Max. Z, Kohm |
|---|---|---|---|---|---|---|---|---|---|---|
| 1 STCH | Strontium Chromate | | | PRIOR | | ART (SEE TABLE III) | | | | |
| 2 CEPH | Cerous Phosphate | Ce | 19 | | | | | 2 | 500 | 1 |
| 3 CEMO | Cerous Molybdate | Ce | 162 | Mo | 20 | | | 0.3 | 0 | 10 |
| 4 LAPH | Lanthanum Phosphate | La | <94 | P | 40558 | | | 0.7 | 0 | 2 |
| 5 CEVO | Cerium Vanadium Oxide | V | 1657 | Ce | <5.18 | | | 0.2 | 0 | 9 |
| 6 BATG | Barium Tungstate | W | <2.64 | | | | | 1 | 440 | 3 |
| 7 CAVA | Calcium Vanadate | V | 120705 | | | | | 0.08 | 0 | 30 |
| 8 BIVA | Bismuth Vanadate (with Molybdate) | V | 10 | | | | | 0.12 | 70 | 6 |
| 9 PHGJ | Phosguard J0806 (Zinc Phosphate/ 1% Molybdenum) | Mo | <50.8 | | | | | 0.2 | 0 | 12 |
| 10 HZMP | Heucophos ZMP (Zinc Molybdenum Phospho-Oxide) | Mo | <50.8 | | | | | 0.18 | 0 | 20 |
| 11 DCCC | DCC 1773 (Calcium Zinc Molybdate) | Mo | <54.7 | | | | | 0.19 | 0 | 14 |
| 12 MWZM | Moly-white 101 (Zinc Molybdate) | Mo | 1621 | | | | | 1.6 | 0 | 1.8 |
| 1 MWED | Moly-white 101 ED+ (Zinc Molybdate) | Mo | 1505 | | | | | 2.1 | 0 | 1.5 |
| 14 MWZP | Moly-white ZNP (Zinc Phospho-Molybdate) | Mo | 1434 | | | | | 1.2 | 0 | 2.5 |
| 15 ZPED | Moly-white ZNP ED+ (Zinc Phospho-Molybdate) | Mo | 3764 | P | 105 | Zn | 1356 | 0.6 | 0 | 3 |
| 16 STTU | Strontium Tungstate | W | <68 | | | | | 0.5 | 410 | 1.5 |
| 17 CATU | Calcium Tungstate | W | <68 | | | | | 0.1 | 60 | 4 |
| 18 BVwM | Bismuth Vanadate (without Molybdate) | | | | | | | 0.7 | 550 | 5 |

TABLE II

Electrochemical Measurements of Combinations of Inhibitor

| Test Code | Compounds | Concentration of elements in supernatant, $\mu$mol/L | | | | | | | $I_{corr}$ uA/cm² | $E_{pit}$–$E_{corr}$ mV | Max. Z, Kohm |
|---|---|---|---|---|---|---|---|---|---|---|---|
| | | W | Mo | Ce | V | Sr | Bi | P | | | |
| 19 WC | Cerous Phosphate + Strontium Tungstate | 8 | | <7 | | 811 | | 16 | 0.3 | 290 | 6 |
| 20 WMC | Cerous Molybdate + Strontium Tungstate | <5 | 129 | 189 | | 633 | | | 0.9 | 390 | 1 |
| 21 WV | Bismuth Vanadate (No Molybdate) + Strontium Tungstate | 658 | | | 90 | 782 | 6 | | 0.4 | 0 | 12 |
| 22 MVC | Cerous Molybdate + Bismuth Vanadate w/Molybdate | | 197 | 51 | <20 | | 9.6 | | 2.0 | 480 | 5 |
| 23 MVCp | Cerous Phosphate + Bismuth Vanadate w/Molybdate | | 26 | <7 | 25 | | 5.5 | 90 | 0.5 | 0 | 7 |

TABLE II-continued

Electrochemical Measurements of Combinations of Inhibitor

| Test Code | Compounds | Concentration of elements in supernatant, μmol/L | | | | | | | $I_{corr}$, uA/cm² | $E_{pit}-E_{corr}$, mV | Max. Z, Kohm |
|---|---|---|---|---|---|---|---|---|---|---|---|
| | | W | Mo | Ce | V | Sr | Bi | P | | | |
| 24 WMV | Bismuth Vanadate w/ Molybdate + Strontium Tungstate | 93 | 144 | | 75 | 441 | 7.4 | | 1.6 | 410 | 1 |

As can be seen from the Tables above, samples 16, 18, (both anodic corrosion inhibitors) and samples 19, 20, 22 and 24 (all combinations of anodic and cathodic inhibitors) showed potential as corrosion inhibiting additives which exhibit effectiveness against both general corrosion and pitting corrosion.

In order to demonstrate the effectiveness over time of inhibiting additives having both an anodic corrosion inhibitor and a cathodic corrosion inhibitor in accordance with the invention as compared to additives which contain only anodic corrosion inhibitors, acidified salt spray tests were conducted under the following conditions. Panels of Aluminum Alloy 6061 were processed by phosphoric acid anodizing, air sprayed with epoxy primers of the corrosion inhibiting additive set forth in Table III and oven cured at 350° F. for 90 minutes. The panels were subjected to acidified salt spray tests conducted for 1000 hours in 5% NaCl solution acidified to pH 3.4 with acetic acid. Visual inspections of the panels were then conducted and the results are shown below in Table III and compared with the prior art, namely, $SrCrO_4$.

TABLE III

| Inhibiting Additive | Pit Clusters |
|---|---|
| $SrCrO_4$ | 1 |
| $CeVO_4$ | 1–5 |
| $CePO_4$ and $SrWO_4$ | 1–5 |
| $CeMoO_4$ and $SrWO_4$ | 1–5 |
| $BiVO_4$ w/ $MoO_4$ | 16–20 |
| $BiVO_4$ | 16–20 |
| $BiVO_4$ and $SrWO_4$ | 20+ |

As can be seen, those additives which contain both anodic and cathodic inhibitors were far more effective against pitting than additives which contain only anodic inhibitors. Also, the additives of the present invention are comparable to the prior art additive of strontium chromate. These tests show that while anodic inhibitors may form a barrier film which produces short term effect (see for example Table I, samples 18 and 16), no long term effect is obtained.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A non-carcinogenic corrosion inhibiting additive comprising an anodic corrosion inhibitor and a cathodic corrosion inhibitor
    wherein the anodic corrosion inhibitor is a compound that is characterized by being soluble in alkaline media, while precipitating as a reduced, insoluble oxide under neutral and acidic reducing conditions, that is, existing as an insoluble oxide below −600 mv vs Ag/AgCl at pH 7, and below −300 mv vs Ag/AgCl at pH 2 and the cathodic corrosion inhibitor is a compound that is characterized by being soluble in acidic media, while undergoing a valance change to precipitate as an insoluble oxide under neutral and alkaline and moderately oxidizing conditions, that is, existing as an insoluble oxide above −300 mv vs Ag/AgCl at pH 7, and above −900 mv vs Ag/AgCl at pH 12.

2. A non-carcinogenic corrosion inhibiting additive according to claim 1 wherein the anodic corrosion inhibitor is selected from the group consisting of compounds of vanadium, molybdenum, tungsten, and mixtures thereof.

3. A non-carcinogenic corrosion inhibiting additive according to claim 2 wherein the anodic corrosion inhibitor is a tungsten compound.

4. A non-carcinogenic corrosion inhibiting additive according to claim 3 wherein the anodic corrosion inhibitor is a tungstate compound.

5. A non-carcinogenic corrosion inhibiting additive according to claim 1 wherein the cathodic corrosion inhibitor is a compound of an element selected from the elements of Group IIIB of the Periodic Table (the CAS version).

6. A non-carcinogenic corrosion inhibiting additive according to claim 1 wherein the cathodic corrosion inhibitor is selected from the group consisting of cerium, neodymium, praseodymium and mixtures thereof.

7. A non-carcinogenic corrosion inhibiting additive according to claim 1 wherein the cathodic corrosion inhibitor is a cerium compound.

8. A non-carcinogenic corrosion inhibiting additive according to claim 1 wherein the cathodic corrosion inhibitor is a cerous compound.

9. A non-carcinogenic corrosion inhibiting additive according to claim 1 wherein the additive is selected from the group consisting of cerous molybdate with bismuth vanadate, cerous molybdate with strontium tungstate, cerous phosphate with strontium tungstate, bismuth vanadate with bismuth molybdate and strontium tungstate, and mixtures thereof.

10. A corrosion inhibiting solution comprising at least a carrier and a corrosion inhibiting additive according to any one of the preceeding claims.

11. A corrosion inhibiting solution according to claim 10 wherein the anodic corrosion inhibitor is present in solution in an amount of at least 1 ppm and the cathodic corrosion inhibitor is present in solution in an amount of at least 1 ppm.

12. A corrosion inhibiting solution according to claim 11 wherein the anodic corrosion inhibitor is present in solution in an amount of between about 10 ppm to 500 ppm and the cathodic corrosion inhibitor is present in solution in an amount of between about 10 ppm to 500 ppm.

13. A corrosion inhibiting solution according to claim 11 wherein the anodic corrosion inhibitor is present in solution in an amount of between about 1 grams/liter to 100 grams/liter and the cathodic corrosion inhibitor is present in solution in an amount of between about 1 grams/liter to 100 grams/liter.

14. A corrosion inhibiting solution according to claim 11 wherein the anodic corrosion inhibitor is present in solution in an amount of between about 10 grams/liter to 50 grams/liter and the cathodic corrosion inhibitor is present in solution in an amount of between about 10 grams/liter to 50 grams/liter.

15. A corrosion inhibiting solution according to claim 10 wherein the carrier comprises at least an organic binder.

16. A corrosion inhibiting solution according to claim 10 wherein the carrier comprises water or alcohol and mixtures thereof.

17. An article comprising a metal substrate having a corrosion inhibiting coating comprising a corrosion inhibiting additive according to any one of claims 1 through 9.

18. An article according to claim 17 wherein anodic corrosion inhibitor is present in the corrosion inhibiting coating in an amount of between about 0.25 to 50 wt. % and the cathodic corrosion inhibitor is present in the amount of between about 0.25 to 50 wt. %.

19. An article according to claim 17 wherein the coating is a conversion coating.

20. An article according to claim 19 wherein anodic corrosion inhibitor is present in the corrosion inhibiting coating in an amount of between about 25 to 250 mg/ft$^2$ and the cathodic corrosion inhibitor is present in the amount of between about 25 to 250 mg/ft$^2$.

21. An article according to claim 17, wherein the coating is a primer, paint, an organic sealant, a sealer for anodized aluminum, or an additive for recirculating water system.

* * * * *